United States Patent [19]

Morikawa et al.

[11] Patent Number: 4,922,410

[45] Date of Patent: May 1, 1990

[54] INPUT/OUTPUT SYSTEM CAPABLE OF ALLOTTING ADDRESSES TO A PLURALITY OF INPUT/OUTPUT DEVICES

[75] Inventors: Takashi Morikawa; Tetuji Ogawa, both of Hadano; Akio Sasaki, Odawara; Kiichi Sato, Hadano, all of Japan

[73] Assignee: Hitachi, Ltd., Tokyo, Japan

[21] Appl. No.: 86,279

[22] Filed: Aug. 17, 1987

[30] Foreign Application Priority Data

Sep. 10, 1986 [JP] Japan .................................. 61-211608

[51] Int. Cl.[5] .............................................. G06F 13/12
[52] U.S. Cl. ................................ 364/200; 364/238.3; 364/241.9; 364/238; 364/231.5
[58] Field of Search ... 364/200 MS File, 900 MS File

[56] References Cited

U.S. PATENT DOCUMENTS

| | | | |
|---|---|---|---|
| 4,056,843 | 11/1977 | Bishop et al. | 364/200 |
| 4,073,005 | 2/1978 | Parkin | 364/200 |
| 4,091,455 | 5/1978 | Woods et al. | 364/200 |
| 4,104,718 | 8/1978 | Poublan et al. | 364/200 |
| 4,191,997 | 3/1980 | Luiz | 364/200 |
| 4,437,157 | 3/1984 | Witalka et al. | 364/200 |
| 4,504,927 | 3/1985 | Callan | 364/900 |

Primary Examiner—Gareth D. Shaw
Assistant Examiner—Christine M. Eakman
Attorney, Agent, or Firm—Fay, Sharpe, Beall, Fagan, Minnich & McKee

[57] ABSTRACT

In an input/output process device for controlling data transfer between a central processing unit and an input/output device through a channel by use of any of a plurality of input/output control devices connected to the input/output device, a memory unit is disposed so as to store information representing the address of the input/output control device in association with an identification number of the channels connected to the input/output control device. When selecting the channel for data transfer, the input/output process device reads out the information representing the address of the input/output control device from the memory unit and generates the address for the input/output control device on the basis of the information read out.

1 Claim, 4 Drawing Sheets

FIG. 4A  LCU CONTROL INFORMATION FOR LCU 6

| | | | | | | | | 31a |
|---|---|---|---|---|---|---|---|---|
| | | | | | | | | |
| 00 | 20 | 00 | 20 | — | — | — | — | |
| CHID 0 | CHID 1 | CHID 2 | CHID 3 | — | — | — | — | |

FIG. 4B  IOD CONTROL INFORMATION FOR IOD 5a

| | | 30a |
|---|---|---|
| | | |
| | | |
| | 40 | |

FIG. 4C  IOD CONTROL INFORMATION FOR IOD 5b

| | | 30b |
|---|---|---|
| / | | |
| | | |
| | 41 | |

FIG. 4D  IOD CONTROL INFORMATION FOR IOD 5c

| | | 30c |
|---|---|---|
| | | |
| | | |
| | 42 | |

INPUT/OUTPUT SYSTEM CAPABLE OF ALLOTTING ADDRESSES TO A PLURALITY OF INPUT/OUTPUT DEVICES

BACKGROUND OF THE INVENTION

In an input/output process device for controlling input/output devices, the present invention relates to an input/output system capable of designating the input/output devices by a plurality of addresses.

It is a general trend in recent large scale general-purpose electric computer systems that addressing to input/output devices is made by hardware. For example, where one input/output device is connected to a plurality of input/output channels through a plurality of input/output control devices, a program only designates the input/output device as the object of access but does not designate a route reaching that input/output device (i.e. the input/output channels and the input/output control devices). In such a computer system, the hardware grasps the connection state of the input/output devices and selects the route reaching the input/output device designated from the program on the basis of its management information. An input/output processing architecture of this kind is disclosed in, for example, "IBM System 370/Extended Architecture, Principles of Operations, SA22-7085" on IBM. To select the route, the hardware keeps the information on the input/output control device group to which the input/output device is connected and the information on the input/output channels to which each input/output control device is connected, for each input/output device.

In the architecture described in the reference mentioned above, only one device address of the input/output device used on an I/O interface is defined for the input/output device. Therefore, all the input/output control devices to which the input/output device is connected have the same control device address.

For the reason described above, if a plurality of input/output control devices are connected to one channel, the input/output control devices having the same controller address must be eliminated. If the input/output control device is connected commonly to two or more computer systems, each computer system must allot the same address to this input/output control device. Thus, flexibility of system architecture drops.

It is a first object of the present invention to allot mutually different addresses to a plurality of input/output control devices connected to a common input/output device.

It is a second object of the present invention to make it possible to determine an input/output device address for input/output control devices used commonly for a plurality of computer systems without limitation of address setting in each of the computer systems.

SUMMARY OF THE INVENTION

In an input/output processing system including a plurality of channels connected to each of a plurality of input/output control devices and a memory unit for storing information representing the address of each of the input/output control devices in association with the identification numbers of the channels connected to the input/output control device, the channel for data transfer is selected upon evoking request from a central processing unit, the information representing the address of the input/output controller is read out from the memory unit and the address of the input/output control device is generated on the basis of the information thus read out.

The present invention eliminates the necessity of allotting always the same controller address to a plurality of input/output control devices to which one input/output device is connected.

BRIEF DESCRIPTION OF THE DRAWINGS

FIG. 4A is a diagram an example of logical input/output controller control information;

FIGS. 4B to 4D are diagrams showing examples of input/output device control information.

DESCRIPTION OF THE PREFERRED EMBODIMENTS

Figure 1:
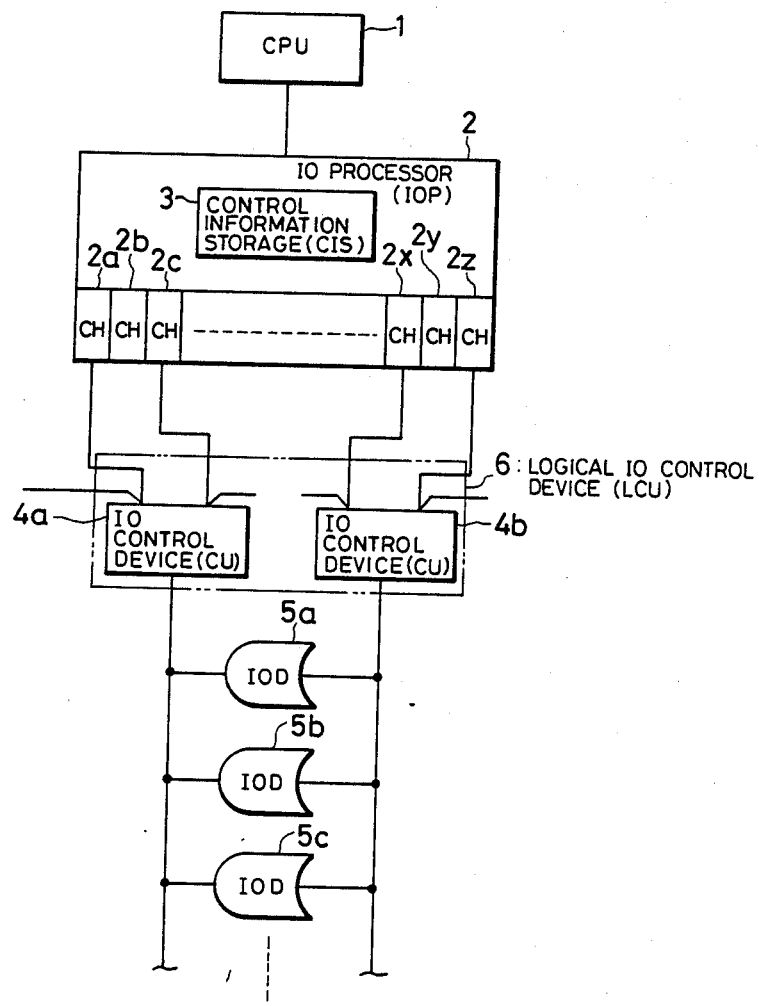
FIG. 1 is a system configuration diagram showing part of a computer system to which the present invention is directed.

Hereinafter, one embodiment of the present invention will be described with reference to the accompanying drawings. FIG. 1 shows part of a construction example of a computer system to which the present invention is directed. In the drawing, reference numeral 1 represents a central processing unit (hereinafter referred to as "CPU"), 2 is an input/output process device (hereinafter referred to as "IOP"), 2a to 2z are input/output channels contained in IOP 2; 3 is a control information storage which is contained in IOP 2 and stores control information necessary for controlling the input/output operation (hereinafter referred to as "CIS"), 4a and 4b are input/output control units (hereinafter referred to as "CPU"), 5a to 5c are input/output devices (hereinafter referred to as "IOD") and 6 (inside dotted line) is a logical input/output control device which puts a plurality of CU groups connected respectively to IOD 5a, 5b, 5c, . . . into one conceptual unit (hereinafter referred to as "LCU"). Though a plurality of LCUs are connected to IOP 2, only one is shown in the drawing.

In FIG. 1, CU 4a is connected to CH 2a, 2c while CU 4b is connected to CH 2x, 2z. Therefore, four paths in all are disposed for the input/output devices 5a, 5b, 5c . . . , that is, two in CU4a and two in CU 4b.

When CPU 1 generates an evoke instruction for IOD 5a, 5b, 5c . . . , IOP 2 selects an empty path out of the four paths and evokes an IOD through that path. The input/output channel exists in the path and controls information exchange between the IOD and a main memory (not shown) in the CPU.

Besides the four paths from IOP 2, LCU 6 is also connected to an IOP connected to other CPU(s) (not shown) and can evoke the IOD from the other CPUs.

Figure 2:
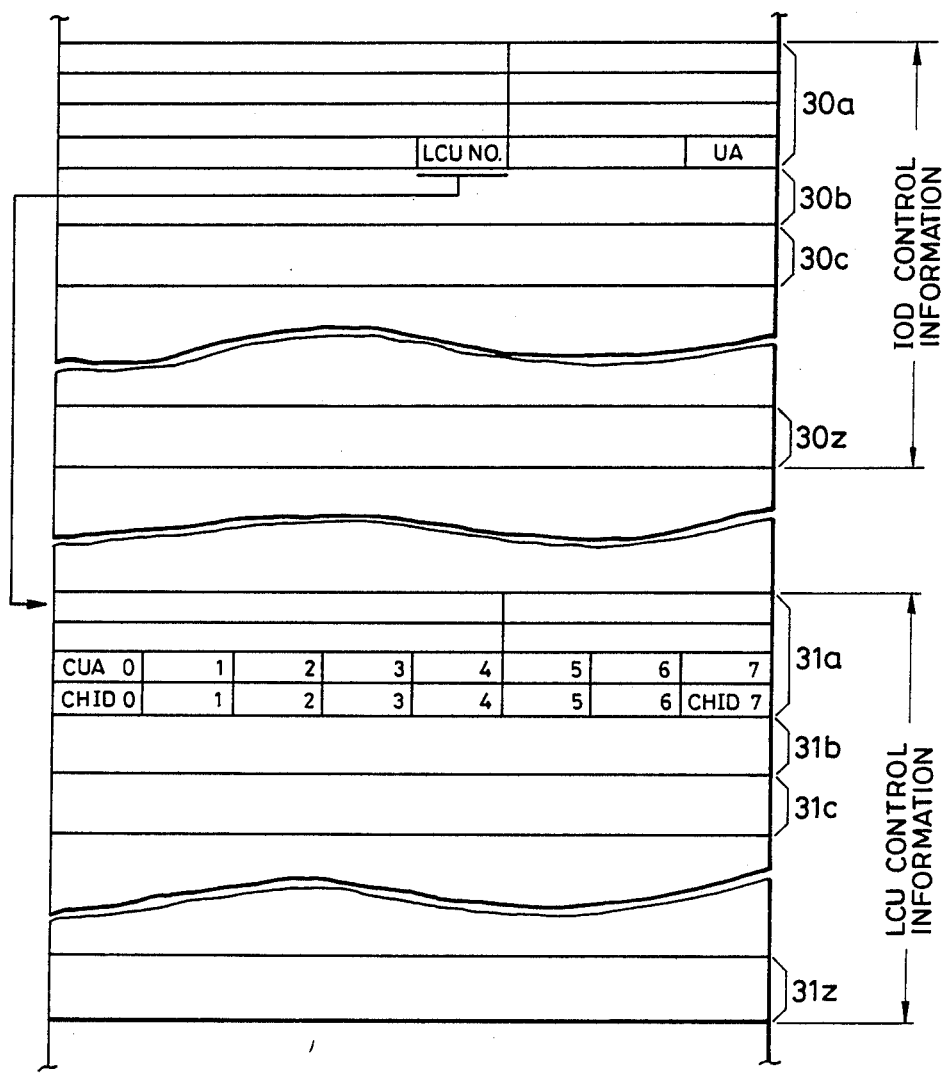
FIG. 2 is a layout diagram showing part of the content of control information memory.

FIG. 2 shows areas for storing IO device control information 30a–30z and areas 31a–31z for storing logical IO control unit (LCU) control information that are directly related with the present invention among the content of CIS 3. The IOD control information storage areas 30a–30z are disposed in the 1:1 relationship with the input/output device irrespective of the numbers of input/output devices and input/output channels to be connected. The IOD control information contains that information which is necessary for controlling the IOD and the CU. Furthermore, the IOD control information contains 1 byte for memorizing each input/output device address (UA) and 1 byte for memorizing an LCU number (LCU No.) associated therewith. The LCU control information storage areas $31a$–$31z$ are disposed in such a manner as to correspond to an LCU to be connected. The LCU control information storage areas $31a$–$31z$ contain the numbers of maximum eight input/output channels to which the LCU is to be connected (i.e. $CHID_0$–$CHID_7$) and the difference value ($CUA_0$–$CUA_7$) of the control unit addresses on the respective input/output channels.

Figure 3:
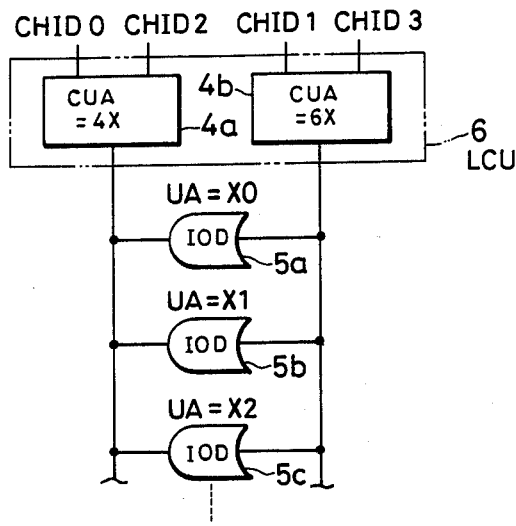
FIG. 3 is a diagram showing the relationship between I/O construction and control information.

FIG. 3 shows the association between the UA value in the IOD control information and the $CUA_0$–$CUA_7$ values in the LCU control information. In the example of the I/O structure shown hereby, the input/output devices $5a$, $5b$, $5c$, . . . are connected to two input/output control devices $4a$, $4b$ and these two input/output control devices are connected to the input/output channels $CHID_0$, $CHID_2$ (corresponding to $CH_{2a}$ and $CH_{2c}$ in FIG. 1) and to $CHID_1$ and $CHID_3$ (corresponding to $CH_{2x}$ and $CH_{2z}$ in FIG. 1), respectively. The device addresses of IOD $5a$, $5b$, $5c$, . . . are $X_0$, $X_1$, $X_2$, . . . , respectively, and X of the second digit is the input/output control device address while the control device addresses of $4a$ and $4b$ are 4X and 6X (whereby the first digit is undetermined and is determined by the input/output device). Therefore, when access is made from the control device $4a$ to $5a$, $5b$, $5c$, . . . , and the like, the input/output device addresses are 40, 41, 42, . . . , respectively. When access is made from the control device $4b$ to $5a$, $5b$, $5c$, . . . , and the like, the input/output device addresses are 60, 61, 62, . . . , and the like, respectively. Under such an I/O construction, the UA value in the IOD control information and the values of $CHID_0$–$CHID_7$ and $CUA_0$–$CUA_7$ in the LCU control information are shown in FIGS. 4A, 4B, 4C and 4D, respectively. Namely, UA and the IOD control information storage area $30a$ corresponding to IOD $5a$ is the smaller device address on both input/output control devices, that is, "40". Similarly, UA in the IOD control information storage area $30b$ corresponding to IOD $5b$ is "41" and UA in the IOD control information storage area $30c$ corresponding to IOD $5c$ is "42". $CHID_0$, $CHID_1$, $CHID_2$ and $CHID_3$ for four paths are set to the channel number storage area of the LCU control information storage area $31a$. Here, the control device address difference value (4X-6X) is 20 between $CU_{4a}$ and $CU_{4b}$. Therefore, as the control device address difference values corresponding to the respective channels, 00 is set for $CHID_0$, 20 is set for $CHID_1$, 00 is set for $CHID_2$ and 20 is set for $CHID_3$. Incidentally, these informations are given to the hardware as the I/O construction information at the time of system construction, stored in the file of the processor and loaded to a suitable portion of CIS whenever the power source is turned on. However, the description in detail on this portion will be omitted because it is not directly relevant to the present invention.

Figure 5:
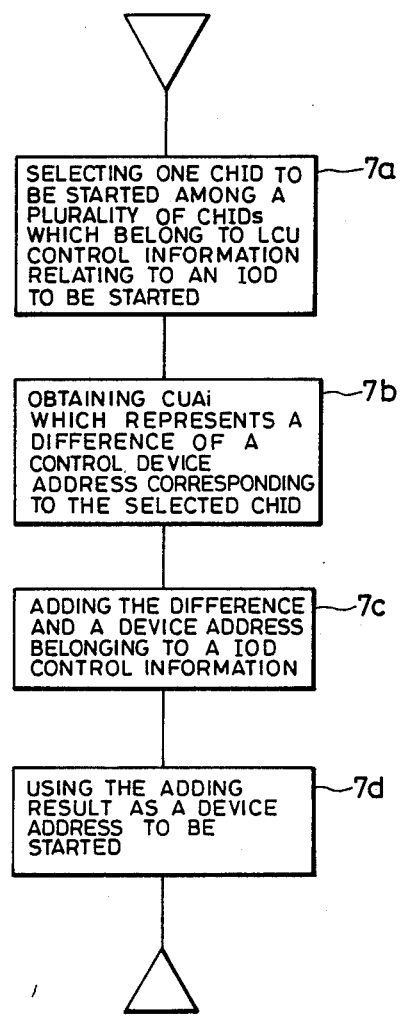
FIG. 5 is a flowchart showing the process for determining a final device address.

Next, the method of determining the device address used for evoking the input/output device by IOP 2 will be explained with reference to FIG. 5. Suppose the evoke instruction of the I/O operation for a certain input/output device is received from the program; then, IOP 2 examines first the content of the IOD control information corresponding to the input/output device to be evoked, and checks whether or not this input/output device can execute a new input/output operation. (This portion is not shown clearly in the drawing). If it can, CHID of the input/output channel to be evoked is selected from the control information of the LCU to which the input/output device belongs. Incidentally, this channel selection is effected in accordance with a certain kind of algorithm but the detailed description thereof will be omitted because it is not directly relevant to the subject matter of the present invention. After the input/output channel is selected, the difference value of the control device address corresponding to the selected CHID is determined from among the same LCU control information at step $7b$. At the next step $7c$, the difference value of the control device address and the UA value in the associated IOD control information are added. The address value thus added is the device address of the input/output device on the selected channel, and the input/output device is evoked by use of this device address at step $7d$.

In the embodiment described above, the difference value of the device address for each channel path is provided in the LCU control information. Accordingly, the embodiment provides the effect that an increase in hardware can be limited (generally, the number of LCUs is from about 1/16 to about 1/64 of the number of IODs) and that the intended object of allotting the control device addresses that vary from input/output control device to device can be accomplished by simple logic. (In this embodiment, the "4X" address is allotted to CU $4a$ and the "6X", to CU $4b$).

In accordance with the present invention, it is not necessary to allot the same control device address to a plurality of input/output control devices to which one input/output device is connected, and allottment of the device addresses at the time of system construction can be simplified. This means that the control device addresses can be allotted irrelevantly to the addresses of the other input/output control devices to which the same input/output device is connected particularly when a large number of input/output control devices are connected to one channel or under the environment where the input/output control devices are connected to another system, whose input/output control devices are connected to still another system, and so forth.

In the present invention, the input/output process device has the device address as the basis of the input/output device, that is, the minimum device address (1 byte) among a plurality of input/output control devices to be connected, in the input/output device control information used for controlling each input/output device, and has the difference value (1 byte × number of control devices) of the device address and the basic device address described above for each control device in the input/output control device control information used for controlling the group of associated input/output control devices. When each input/output device is evoked, the device address is used which is determined by adding the basic device address and the above-mentioned device address difference value relating to the control device to be started. Accordingly, the device addresses that vary from control device to control device can be allotted by merely increasing the number of bytes corresponding to the number of the input/output control devices in the input/output control device control information.

What is claimed is:

1. An input/output system connected to a central processing unit comprising:

a plurality of input/output devices, each of the plurality of input/output devices being assigned to a plurality of first device addresses;

a plurality of input/output control devices for controlling the plurality of input/output devices by using a selected one of the first device addresses; and an input/output processor including,
- a plurality of channels for performing data transmission between any one of the plurality of input/output control devices and the central processing unit,
- memory means for storing at least one of the first device addresses from the input/output devices,
- the memory means including means for storing a plurality of codes corresponding to the channels, each of the plurality of codes representing a relationship between one of the first device addresses stored in the memory means and a second device address, wherein the second device address is utilized in an event wherein a corresponding channel is already selected,
- means for selecting one of the channels pursuant to a start request of the input/output device received from the central processing unit,
- means for reading out the first device address of the input/output device from the memory means,
- means for reading out from the memory means one of the codes corresponding to the selected channel, and
- means for generating a complete address by using one of the first device addresses and one of the codes, whereby the generated address is used to access the input/output device through the selected channel.

* * * * *

UNITED STATES PATENT AND TRADEMARK OFFICE
CERTIFICATE OF CORRECTION

PATENT NO. : 4,922,410

DATED : May 1, 1990

INVENTOR(S) : Takashi Morikawa, et al.

It is certified that error appears in the above-identified patent and that said Letters Patent is hereby corrected as shown below:

TITLE PAGE:
    Inventors: Tetuji Ogawa should be Tetsuji Ogawa

Signed and Sealed this

Thirtieth Day of July, 1991

Attest:

HARRY F. MANBECK, JR.

*Attesting Officer*      *Commissioner of Patents and Trademarks*